US011143061B2

(12) United States Patent
Ono et al.

(10) Patent No.: US 11,143,061 B2
(45) Date of Patent: Oct. 12, 2021

(54) CONNECTION UNIT, ELECTRIC MOTOR, AND VALVE TIMING CHANGE DEVICE

(71) Applicant: MIKUNI CORPORATION, Tokyo (JP)

(72) Inventors: Takeshi Ono, Kanagawa (JP); Kouji Sugano, Kanagawa (JP); Yuuhei Sanekata, Kanagawa (JP); Hiroki Ota, Kanagawa (JP); Toshinori Inafune, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 16/655,200

(22) Filed: Oct. 16, 2019

(65) Prior Publication Data

US 2020/0149438 A1 May 14, 2020

(30) Foreign Application Priority Data

Nov. 12, 2018 (JP) .............................. JP2018-211903

(51) Int. Cl.
| | | |
|---|---|---|
| *F01L 1/34* | (2006.01) | |
| *F16D 3/26* | (2006.01) | |
| *H02K 7/00* | (2006.01) | |
| *F16D 3/10* | (2006.01) | |
| *H02K 5/24* | (2006.01) | |

(52) U.S. Cl.
CPC ................. *F01L 1/34* (2013.01); *F16D 3/10* (2013.01); *F16D 3/26* (2013.01); *H02K 5/24* (2013.01); *H02K 7/003* (2013.01)

(58) Field of Classification Search
CPC ... F01L 1/344; F01L 1/352; F01L 1/46; F01L 2013/103; F01L 2810/03; F01L 2810/04; F01L 2820/032; F16D 3/04; F16D 3/10; F16D 3/26; F16D 3/265; H02K 7/003
USPC ............................................ 123/90.15, 90.17
See application file for complete search history.

(56) References Cited

U.S. PATENT DOCUMENTS

| | | | | |
|---|---|---|---|---|
| 3,789,627 A | * | 2/1974 | Smith ....................... | F16D 3/04 464/105 |
| 5,090,261 A | * | 2/1992 | Nakatsukasa ............. | B60S 1/08 384/610 |
| 6,527,642 B1 | * | 3/2003 | Arai ...................... | B62D 5/0409 464/104 |
| 2004/0184205 A1 | * | 9/2004 | Ido ......................... | H02K 7/003 361/23 |

(Continued)

FOREIGN PATENT DOCUMENTS

| | | |
|---|---|---|
| JP | 2015188302 | 10/2015 |
| JP | 5940954 | 6/2016 |

*Primary Examiner* — Jorge L Leon, Jr.
(74) *Attorney, Agent, or Firm* — JCIPRNET

(57) ABSTRACT

A connection unit connected to a rotation body by fitting to transmit a rotation force includes a rotation shaft, having a width across flat portion; and a core member, having fitting portions fitted to the rotation body in a direction perpendicular to the width across flat portion and an annular portion that the width across flat portion are slidably fitted, and held on the rotation shaft to be capable of moving relatively in two dimensions along the width across flat portion while rotating integrally with the rotation shaft. Accordingly, generation of vibration or noise can be prevented, and easiness of assembly work, cost reduction, miniaturization and the like can be achieved.

15 Claims, 15 Drawing Sheets

(56) References Cited

U.S. PATENT DOCUMENTS

| | | | |
|---|---|---|---|
| 2007/0101961 A1* | 5/2007 | Teraya | F02D 41/06 123/90.17 |
| 2007/0209621 A1* | 9/2007 | Mizutani | F01L 1/024 123/90.17 |
| 2015/0252853 A1* | 9/2015 | Inoue | F16D 3/26 464/112 |
| 2015/0252854 A1* | 9/2015 | Hakamata | H02K 7/1166 464/73 |
| 2016/0131199 A1* | 5/2016 | Yamashita | F16D 43/02 74/405 |
| 2018/0073655 A1* | 3/2018 | Miyachi | F01L 1/344 |

\* cited by examiner

CONNECTION UNIT, ELECTRIC MOTOR, AND VALVE TIMING CHANGE DEVICE

CROSS REFERENCE TO RELATED APPLICATIONS

This application claims the priority benefit of Japanese Patent Application No. 2018-211903, filed on Nov. 12, 2018. The entirety of the above-mentioned patent application is hereby incorporated by reference herein and made a part of this specification.

BACKGROUND OF THE DISCLOSURE

Technical Field

The disclosure relates to a connection unit for absorbing eccentricity and declination of a rotation shaft and transmitting a rotation force, an electric motor equipped with connection unit, and a valve timing change device equipped with connection unit.

Related Art

As a conventional valve timing change device, the following valve timing change device is known in which a rotation body such as an input cam or the like included in a speed reduction mechanism or a phase adjustment mechanism is rotated by a rotation driving force of an electric motor to change valve timing. Herein, as a connection unit of the electric motor connected to the rotation body, the following connection unit is known which includes: an output shaft that is rotated by the motor body, a pin member that is cylindrical and pressed into a through hole of the output shaft, and a core member that is supported swingably around the pin member and movably along the pin member (for example, see patent literature 1: Japanese Laid-Open No. 2015-188302 and patent literature 2: Japanese Patent No. 5940954).

In a conventional connection unit, when a shaft line of the output shaft of the electric motor is in a state position shift such as eccentricity, declination or the like is generated with respect to a rotation centre line of the rotation body included in the valve timing change device, the core member moves along the pin member and generates a swing movement centred on the pin member while following the rotation of the output shaft. That is, the core member is held to be capable of moving three-dimensionally with respect to the output shaft.

Particularly, the swing movement of the core member encourages generation of vibration or noise caused by a collision between the core member and the rotation body. In addition, the pin member is pressed into the through hole of the output shaft, and thus a high processing accuracy is required, resulting in cost increase. Furthermore, the pin member is inserted into an insertion hole of the core member and is pressed into the through hole of the output shaft, and thus it is necessary to position the output shaft and the core member with respect to the pin member, resulting in complication of assembly work, increase in assembly cost, and the like.

SUMMARY

The disclosure provides a connection unit, an electric motor, and a valve timing change device with which it is possible to prevent generation of vibration or noise and achieve easiness of assembly work, cost reduction, miniaturization and the like.

In one embodiment, a connection unit of the disclosure is provided to be connected to a rotation body by fitting to transmit a rotation force and includes a rotation shaft, having a width across flat portion; and a core member, having fitting portions fitted to the rotation body in a direction perpendicular to the width across flat portion and an annular portion in which the width across flat portion is slidably fitted, and held on the rotation shaft to be capable of moving relatively in two dimensions along the width across flat portion while rotating integrally with the rotation shaft.

According to another embodiment of the disclosure, an electric motor is provided to include a connection unit which is connected to an external rotation body to transmit a rotation driving force, and a connection unit having any of the above configurations is used as the connection unit.

According to another embodiment of the disclosure, a valve timing change device is an engine valve timing change device including a phase change unit that changes a relative rotation phase between a camshaft and a housing rotor interlocked with a crankshaft; and an electric motor including a connection unit that is connected to a rotation body of the phase change unit to transmit a rotation driving force. The valve timing change device changes opening and closing time of a valve for intake or exhaust driven by the camshaft to an advancing side or a retarding side, and a connection unit having any of the above configurations is used as the connection unit.

DESCRIPTION OF THE EMBODIMENTS

Figure 1:
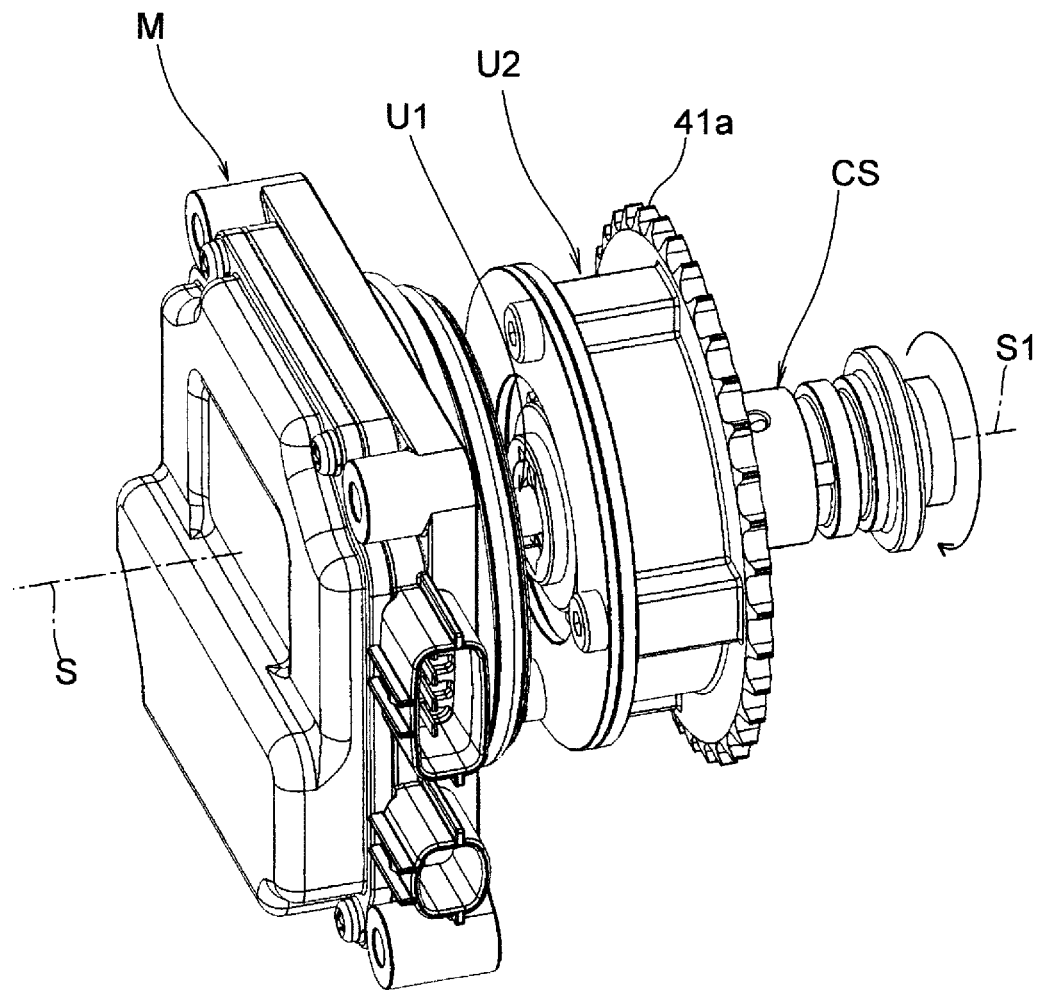
FIG. 1 is an appearance perspective view in which a valve timing change device equipped with an electric motor including a connection unit of the disclosure is viewed diagonally from the front.
Figure 2:
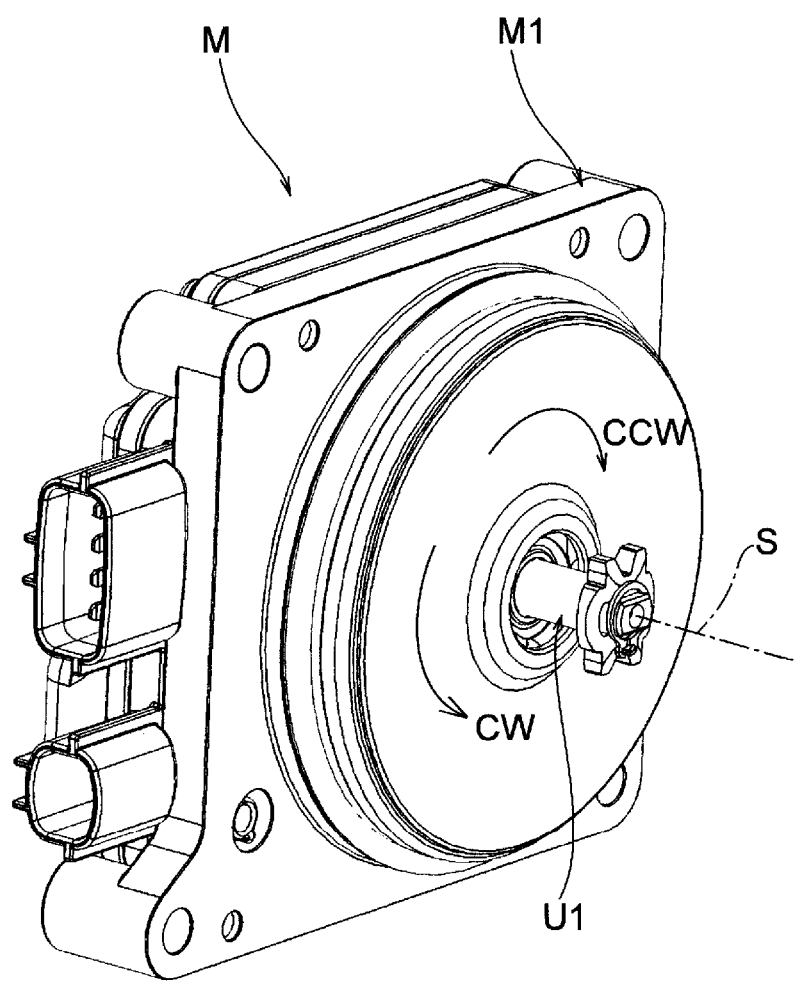
FIG. 2 is an appearance perspective view in which the electric motor shown in FIG. 1 is viewed diagonally from the back.

Embodiments of the disclosure are described below with reference to FIGS. 1-15. As shown in FIG. 1, a valve timing change device of one embodiment comprises an electric motor M including a connection unit U1, and a phase change unit U2 which changes a relative rotation phase between a camshaft CS and a sprocket 41a. Here, the camshaft CS rotates in one direction around a rotation center line S1, and the sprocket 41a rotates in one direction around the rotation center line S1 and interlocks with rotation of the crankshaft CS via a chain.

The electric motor M is a brushless DC motor and includes a rotor having a permanent magnet, a stator including an excitation coil, a control circuit board on which a control circuit and electronic components are mounted, other electronic components, a housing M1 which defines an outer profile, and the connection unit U1 which is connected to the rotor and protrudes from the housing M1.

Figure 3:
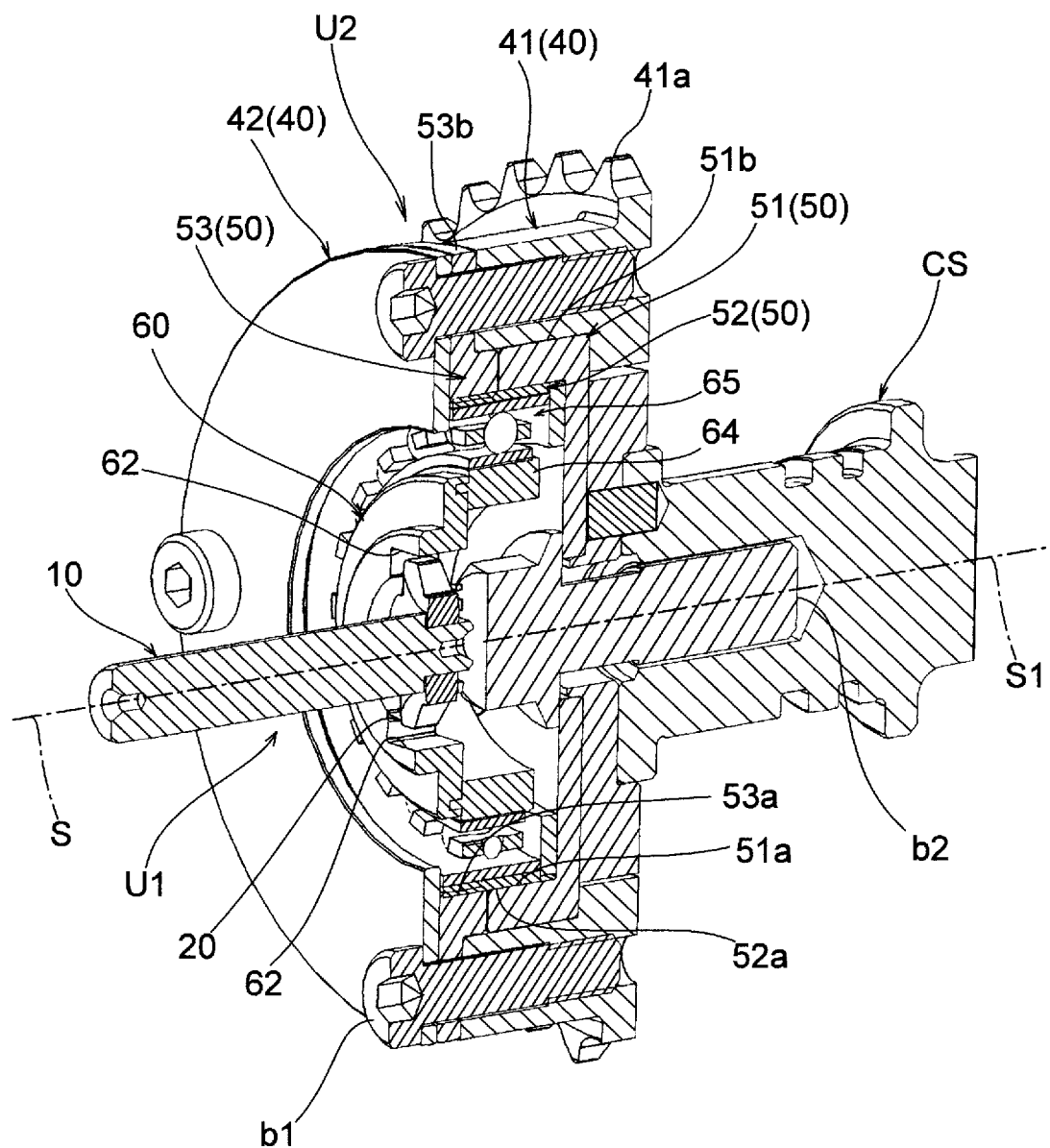
FIG. 3 is a perspective cross-sectional view showing the connection unit of the disclosure and a phase change unit.
Figure 6:
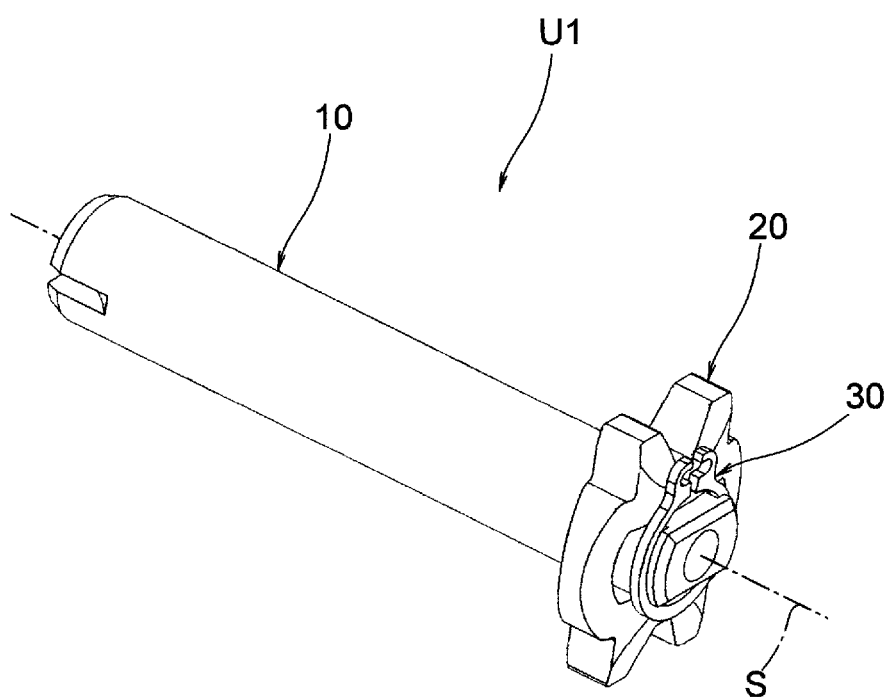
FIG. 6 is an appearance perspective view showing the connection unit of the disclosure.
Figure 7:
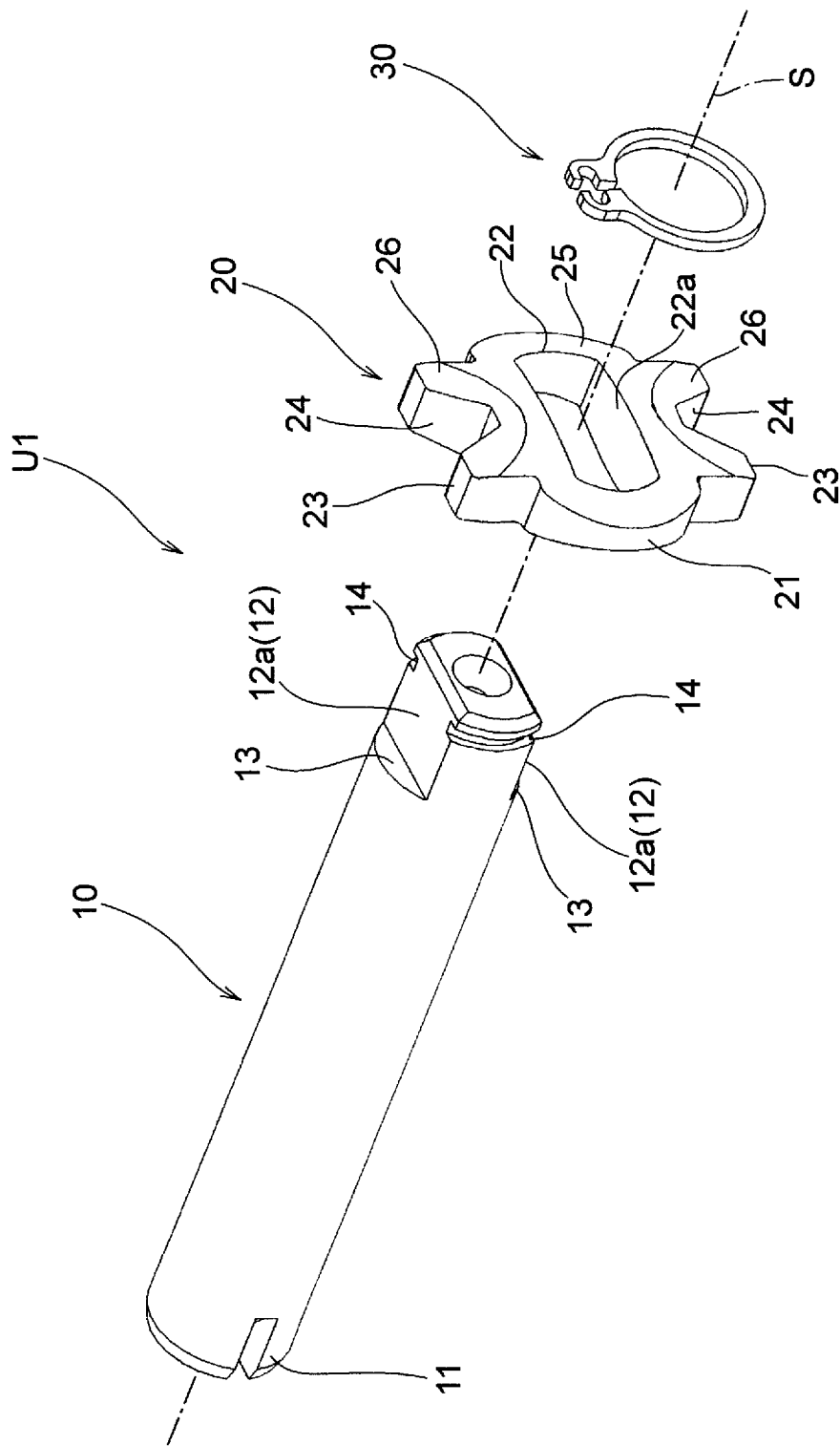
FIG. 7 is an exploded perspective view of the connection unit shown in FIG. 6.

As shown in FIG. 6 and FIG. 7, the connection unit U1 includes a rotation shaft 10 rotating around a shaft line S, a core member 20, and a C-ring 30 used as a stopper. As shown in FIG. 3, the phase change unit U2 includes a housing rotor 40, a wave gear mechanism 50, and a rotation body 60 rotating around the rotation center line S1.

Then, the electric motor M is assembled to an engine in the manner that the connection unit U1 is connected to the phase change unit U2 and the housing M1 is fixed to a chain cover member by screws for example. Here, it is ideal to perform the assembly in the manner that the shaft line S of the rotation shaft 10 of the connection unit U1 included in the electric motor M coincides with the rotation center line S1 of the rotation body 60 included in the phase change unit U2, but actually, the assembly may be performed in a state that the shaft line S is eccentric or declined with respect to the rotation center line S1 due to manufacturing error, assembly error or the like.

Therefore, the connection unit U1 functions to transmit a rotation driving force of the electric motor M to the rotation body 60 while absorbing the eccentricity and declination based on position shift of the shaft line S with respect to the rotation center line S1. In addition, in the valve timing change device, the phase change unit U2 is appropriately driven and controlled by the electric motor M via the connection unit U1, and thereby opening and closing time (valve timing) of an intake valve or an exhaust valve driven by the camshaft CS is changed.

Figure 10:
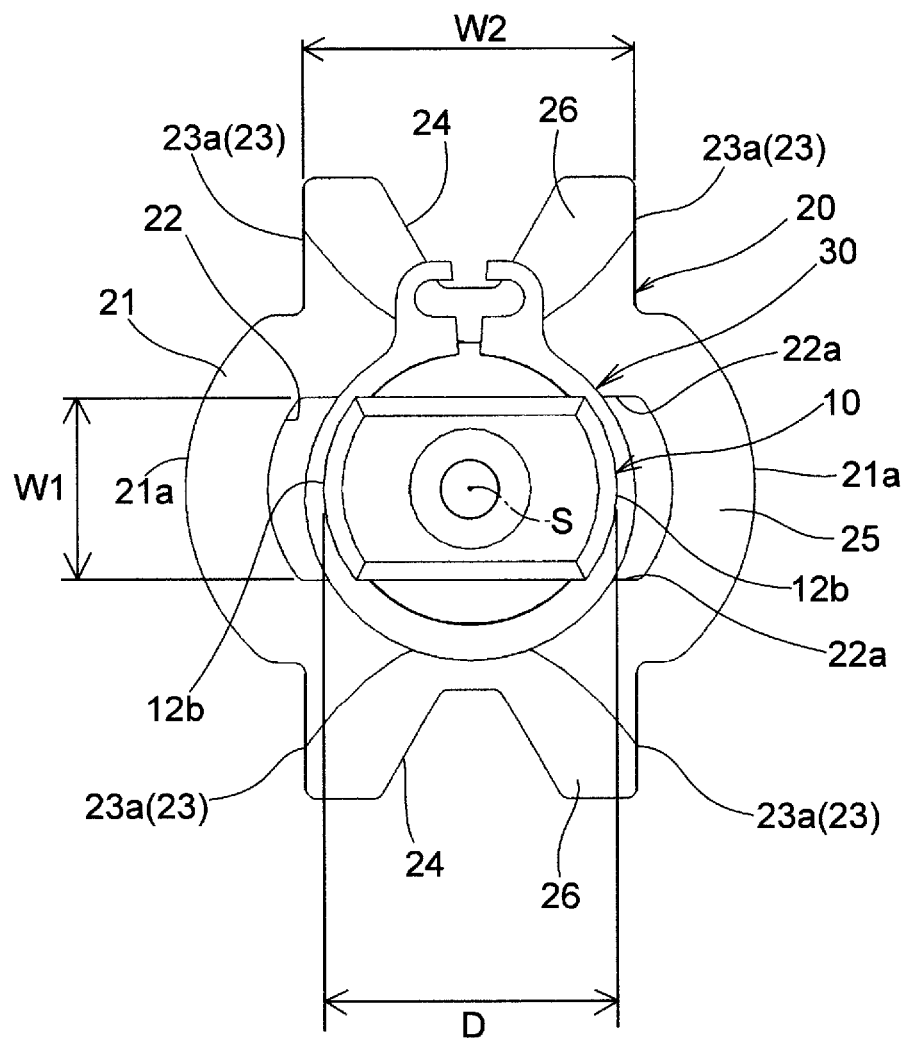
FIG. 10 is an end view in which the connection unit shown in FIG. 6 is viewed from a shaft line direction.

As shown in FIG. 6, FIG. 7, FIG. 10, the rotation shaft 10 is formed using a metal material into a cylindrical shape with an outer diameter D centered on the shaft line S, and includes a connection portion 11 on one end side and a width across flat portion 12, a step portion 13, and fitting grooves 14 on the other end side.

To rotate integrally with the rotor of the electric motor M, the connection portion 11 is formed so that the rotor is fixed to the connection portion 11. The width across flat portion 12 has a point symmetrical shape centered on the shaft line S with a width dimension W1 that can secure mechanical strength necessary for transmitting a rotation force, and is defined by two parallel flat surfaces 12a, 12a. The width across flat portion 12 functions to hold the core member 20 in a two-dimensionally slidable manner and to rotate the core member 20 together around the shaft line S.

The step portion 13 is formed as a plane perpendicular to the flat surfaces 12a to define a boundary of the width across flat portion 12 in the shaft line S direction. Besides, the step portion 13 functions as a regulation guide portion which regulates a movement of the core member 20 in the shaft line S direction of the rotation shaft 10 and guides a two-dimensional movement of the core member 20.

The fitting grooves 14 are formed as two circular arc grooves which are formed by cutting an outer peripheral surface of the rotation shaft 10 into circular arc shapes with a certain depth on the front end sides of the width across flat portion 12 in the shaft line S direction. Then, the C-ring 30 which functions as the regulation guide portion is fitted in the fitting grooves 14. Here, the fitting grooves 14 are formed so that the C-ring 30 is positioned at a position separated from the step portion 13 by a distance (W+ΔC) obtained by adding a play allowance ΔC to a thickness dimension W of the core member 20 in the shaft line S direction.

Here, since the play allowance ΔC is arranged, the core member 20 can move smoothly without generating a bite or stick phenomenon with respect to the step portion 13 and the C-ring 30 which function as the regulation guide portion when the core member 20 moves two-dimensionally along the width across flat portion 12.

As shown in FIGS. 7-11, the core member 20 is formed into a substantially rectangular plate shape using a metal material and includes an annular portion 21, an opening portion 22, a pair of fitting portions 23 which protrude in a direction perpendicular to the width across flat portion 12, cut-outs 24 which are formed in regions of the fitting portions 23, convex curved surfaces 25 which are formed on both sides of the shaft line S direction, and tapered surfaces 26 which are formed in the regions of both fitting portions 23.

The annular portion 21 is formed into a substantially rectangular annular shape being elongated in a longitudinal direction (a straight line H direction) of the width across flat portion 12, and includes circular arc surfaces 21a on both sides of the longitudinal direction. The circular arc surfaces 21a are formed so that a gap is always generated between the circular arc surfaces 21a and the inner wall surfaces of the through hole 61 of the rotation body 60 even when the maximum position shift (eccentricity, declination) of the rotation shaft 10 is considered.

The opening portion 22 is defined on the inner side of the annular portion 21 and formed into a substantially rectangular shape in which the width across flat portion 12 of the rotation shaft 10 is slidably fitted. Besides, the opening portion 22 includes, in a region in contact with the flat surfaces 12a, 12a of the width across flat portion 12, two inner wall surfaces 22a, 22a which are flat and parallel to each other. In addition, the opening portion 22 is formed so that a gap is always generated between the opening portion 22 and circular arc surfaces 12b which are located at both ends of the width across flat portion 12 in the longitudinal direction even when the maximum position shift (eccentricity, declination) of the rotation shaft 10 is considered in the longitudinal dimension of the width across flat portion 12.

Accordingly, the core member 20 is held movably in a state that the inner wall surfaces 22a, 22a of the opening portion 22 are in contact with the flat surfaces 12a, 12a of the width across flat portion 12, and thus falling of the core member 20 can be prevented reliably. Therefore, the core member 20 can move two-dimensionally along the width across flat portion 12 while maintaining a posture perpendicular to the flat surfaces 12a, 12a of the width across flat portion 12.

The fitting portions 23 are fitted in the fitting grooves 62 of the rotation body 60 and formed protruding in a substantially rectangular shape from the annular portion 21 in a direction (a straight line V direction) perpendicular to the flat surfaces 12a, 12a of the width across flat portion 12. The fitting portions 23 define flat engagement surfaces 23a on both outer sides of the direction of the straight line H perpendicular to the shaft line S and the straight line V. A width dimension W2 of the fitting portions 23 is formed to be a dimension with which the fitting portions 23 are slidably fitted in the fitting grooves 62 of the rotation body 60. Accordingly, the engagement surfaces 23a of the fitting portions 23 can be slidably in surface contact with wall surfaces 62a of the fitting grooves 62 to reliably transmit a rotation force without rattling and the like.

The cut-outs 24 are formed, in the regions of the fitting portions 23, into substantially U-shapes or V-shapes which open outward in the direction (the straight line V direction) perpendicular to the width across flat portion 12, that is, toward the front ends. By arranging the cut-outs 24 in the regions of the fitting portions 23 in this way, the core member 20 can be lightened, and lightening of the connection unit U1, reduction in inertia moment and the like can be achieved.

Figure 9:
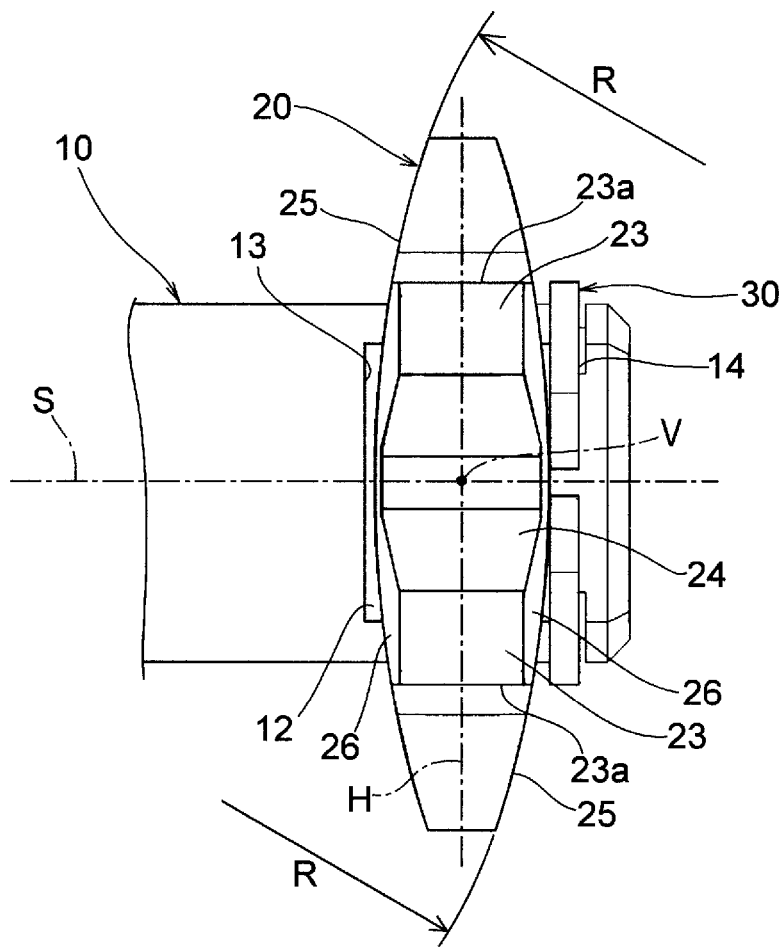
FIG. 9 is a partial plan view showing a part of the connection unit shown in FIG. 6.
Figure 11:
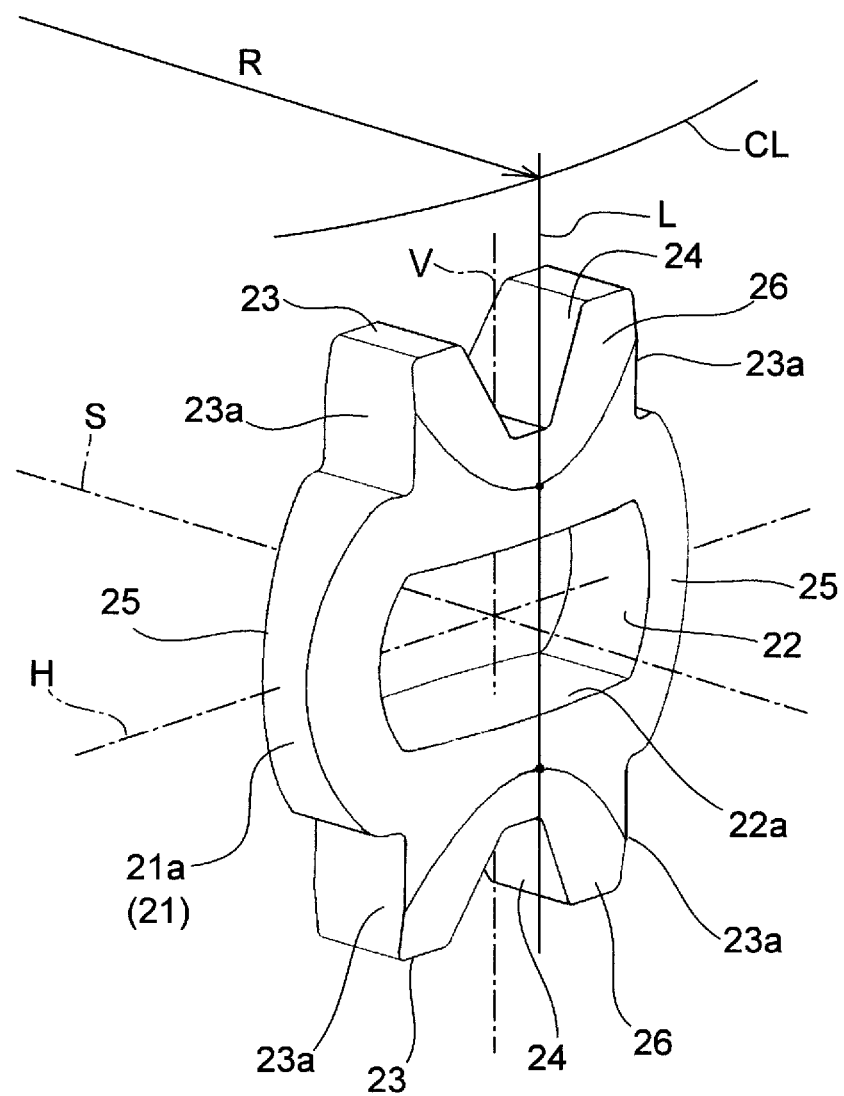
FIG. 11 is an appearance perspective view showing a core member which forms a part of the connection unit shown in FIG. 6.

As shown in FIG. 9 and FIG. 11, the convex curved surfaces 25 are defined by a curved surface which is formed when a straight line L perpendicular to the width across flat portion 12 is moved along a curved line CL. Here, the curved line CL is located on a plane parallel to the plane including the shaft line S and the straight line H, and is drawn by a curvature radius R having a center on the plane including the shaft line S and the straight line V. That is, the convex curved surfaces 25 are formed to become a part of the cylindrical surface with the straight line L perpendicular to the width across flat portion 12 as a generating line. Besides, in FIG. 11, the shaft line S, the straight line H, and the straight line V are drawn to be orthogonal to each other at the center of the core member 20.

Figure 12:
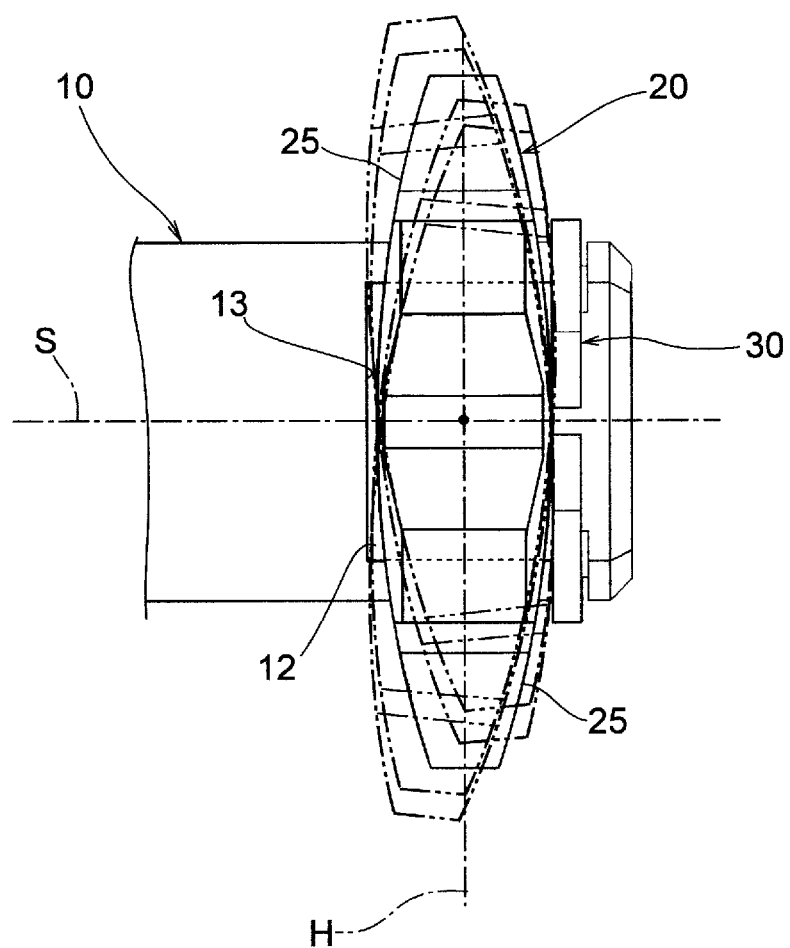
FIG. 12 is a plan view illustrating a two-dimensional movement of the core member with respect to a rotation shaft in the connection unit shown in FIG. 6.

In this way, the convex curved surfaces 25 are arranged on both sides of the shaft line S direction of the core member 20, and thus the core member 20 can two-dimensionally move smoothly along the width across flat portion 12 as shown by double-dashed lines in FIG. 12 while the convex curved surfaces 25 come into contact with and regulated by the step portion 13 or the C-ring 30 used as the regulation guide portion. Particularly, the convex curved surfaces 25 are formed to become a part of the cylindrical surface, and thus core member 20 can slide smoothly with respect to the step portion 13 and the C-ring 30 and move two-dimensionally while maintaining the posture perpendicular to the width across flat portion 12. In addition, generation of vibration or noise accompanying the movement of the core member 20 can be prevented.

Figure 8:
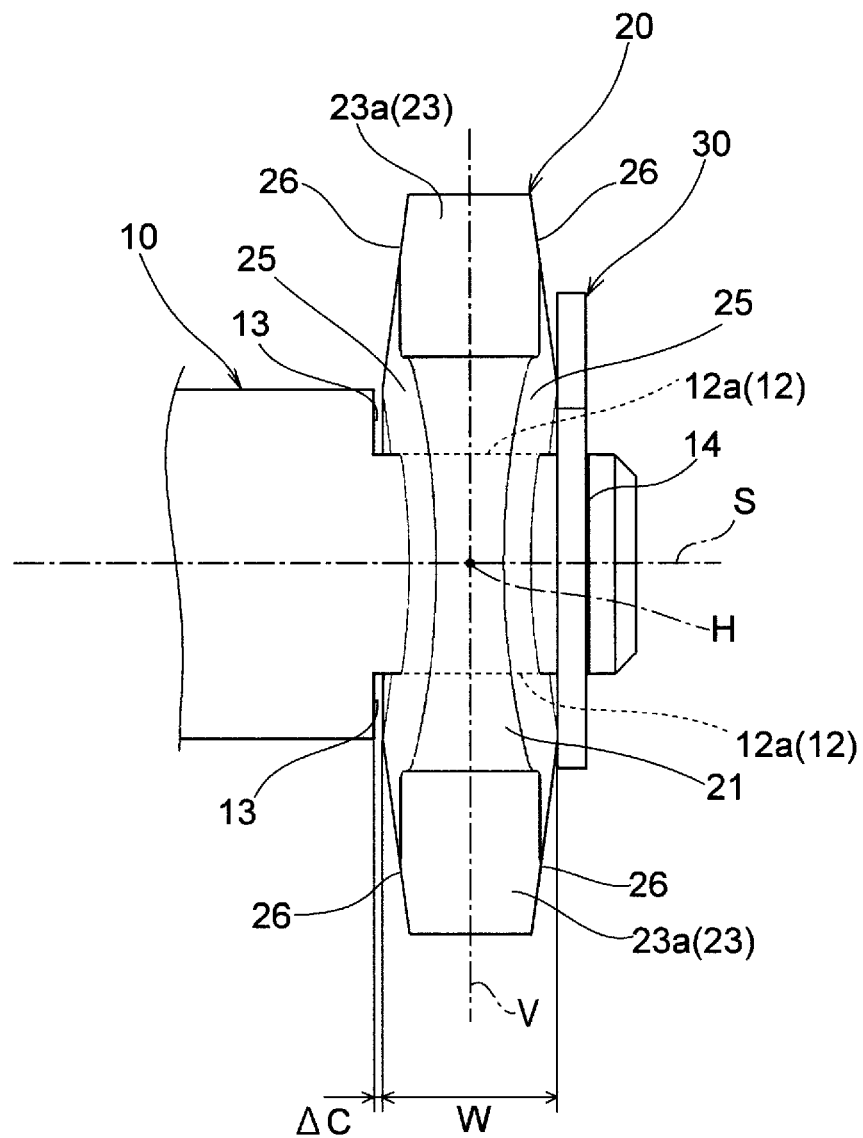
FIG. 8 is a partial side view showing a part of the connection unit shown in FIG. 6.

As shown in FIG. 8, the tapered surfaces 26 are formed in the regions of the fitting portions 23 so that the thickness dimension in the shaft line S direction decreases gradually toward the outer side of the straight line V direction, that is, toward the front ends. Here, the tapered surfaces 26 are formed so that the core member 20 does not protrude from an end surface 63 of the rotation body 60 even when the maximum position shift (eccentricity, declination) of the rotation shaft 10 is considered.

Accordingly, when the shaft line S of the rotation shaft 10 rotates in a state of being eccentric or declined with respect to the rotation center line S1 of the rotation body 60, the fitting portions 23 of the core member 20 can transmit the rotation force from the rotation shaft 10 to the rotation body 60 while maintaining a state of not protruding from the end surface 63 of the rotation body 60. Therefore, interference of the core member 20 with other adjacent members can be prevented, and transmission operations of the rotation force are performed reliably.

The core member 20 having the above configuration, as a whole, is formed in point symmetry respectively centered on the shaft line S, the straight line V, and the straight line H, in plane symmetry with respect to the plane including the shaft line S and the straight line V, and in plane symmetry with respect to the plane including the straight line V and the straight line H. Because the core member 20 is formed into a symmetrical shape in this way, there is no directionality of front, back, up and down, and the core member 20 can be attached to the width across flat portion 12 of the rotation shaft 10 regardless of its orientation and workability is improved. In addition, the core member 20 has a plate shape, and the whole outer profile is formed by the annular portion 21 and a pair of fitting portions 23 which is narrower in width than the annular portion 21 and which protrudes from the annular portion 21, and thus miniaturization, thinning and the like of the core member 20 can be achieved.

The C-ring 30 is a snap ring which is formed, using a spring material or the like made of metal, into a configuration in which a part of the ring is removed. Then, the C-ring 30 functions as a stopper fitted and fixed in the fitting grooves 14 of the rotation shaft 10 so as to cooperate with the step portion 13 to clamp the core member 20 and prevents falling of the core member 20. In addition, the C-ring 30 also functions as a regulation guide portion which regulates the movement of the core member 20 in the shaft line S direction of the rotation shaft 10 and guides the two-dimensional movement of the core member 20.

In this way, by employing the C-ring 30 as a stopper, assembly of the connection unit U1 can be completed and the assembly work can be easily performed merely by mounting the C-ring 30 after the core member 20 is fitted in the width across flat portion 12 of the rotation shaft 10. In addition, because the step portion 13 formed on the rotation shaft 10 and the C-ring 30 attached to the rotation shaft 10 are employed as the regulation guide portion, only the C-ring 30 is used as separate component and structure simplification can be achieved as a whole.

In addition, the core member 20 is formed so that the thickness dimension W in the shaft line S direction of the rotation shaft 10 is smaller than the width dimension W1 of the width across flat portion 12. Accordingly, in the shaft line S direction of the rotation shaft 10, the core member 20 can be formed into a plate shape to be thinned, and lightening and miniaturization of the connection unit U1 and reduction in inertia moment can be achieved. In addition, the core member 20 can be thinned, and thereby contribution can be also made to thinning and miniaturization of the rotation body 60 to which the core member 20 is connected and of the phase change unit U2.

Next, the assembly work of the above connection unit U1 is described. When starting the assembly work, the rotation shaft 10, the core member 20, and the C-ring 30 are prepared. Firstly, the width across flat portion 12 of the rotation shaft 10 is inserted into the opening portion 22 of the core member 20, and the core member 20 is assembled to the rotation shaft 10. Then, from the outer side of the core member 20, the C-ring 30 is fitted into the fitting grooves 14 of the rotation shaft 10 to be assembled to the rotation shaft 10. Accordingly, the assembly of the connection unit U1 is completed. In this way, the assembly work can be easily completed without pressing work or positioning work necessary for a conventional structure.

Figure 13:
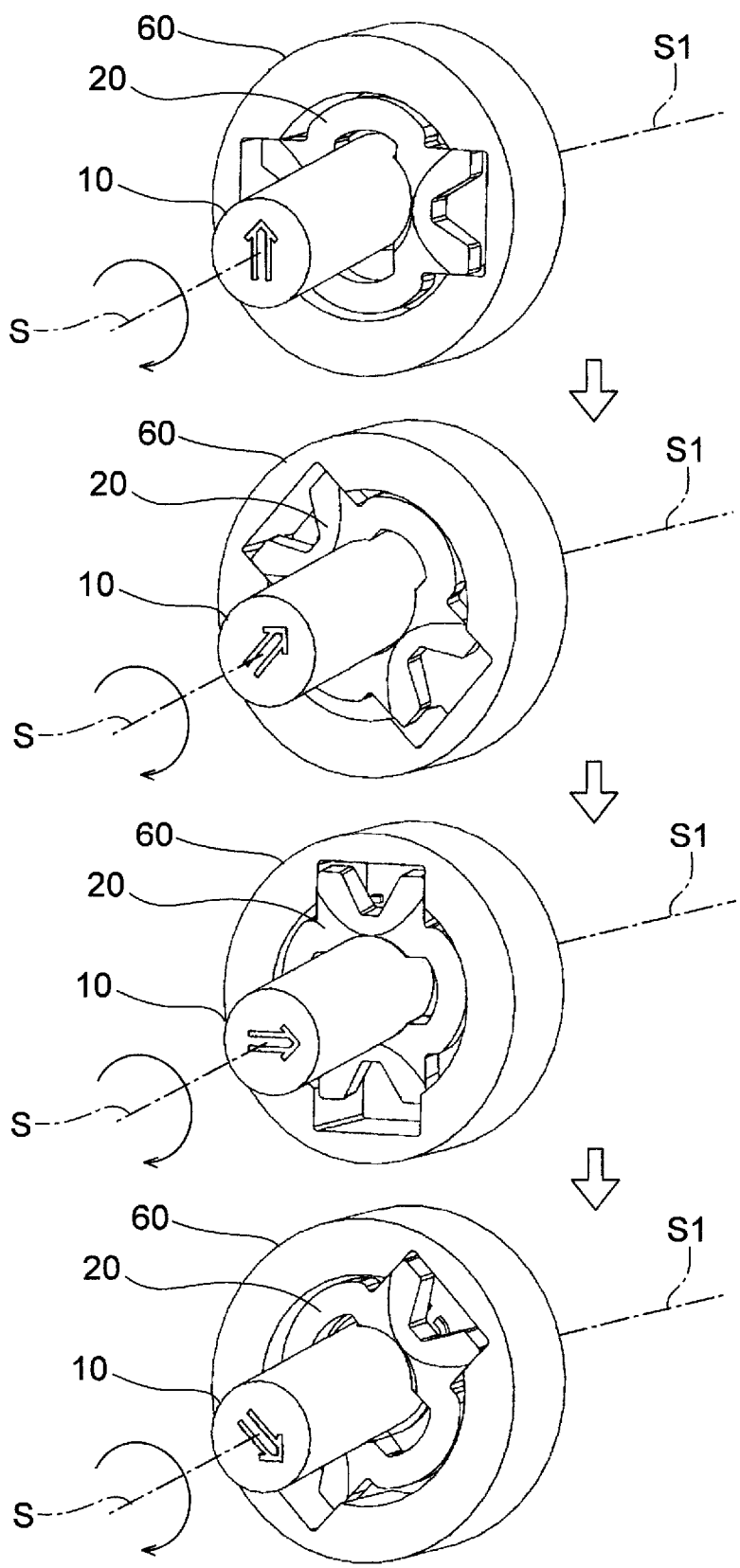
FIG. 13 is an operation diagram illustrating operations of the core member when a shaft line of the rotation shaft included in the connection unit of the disclosure is in a state of being eccentric and declined with respect to a shaft line of the rotation body.
Figure 14:
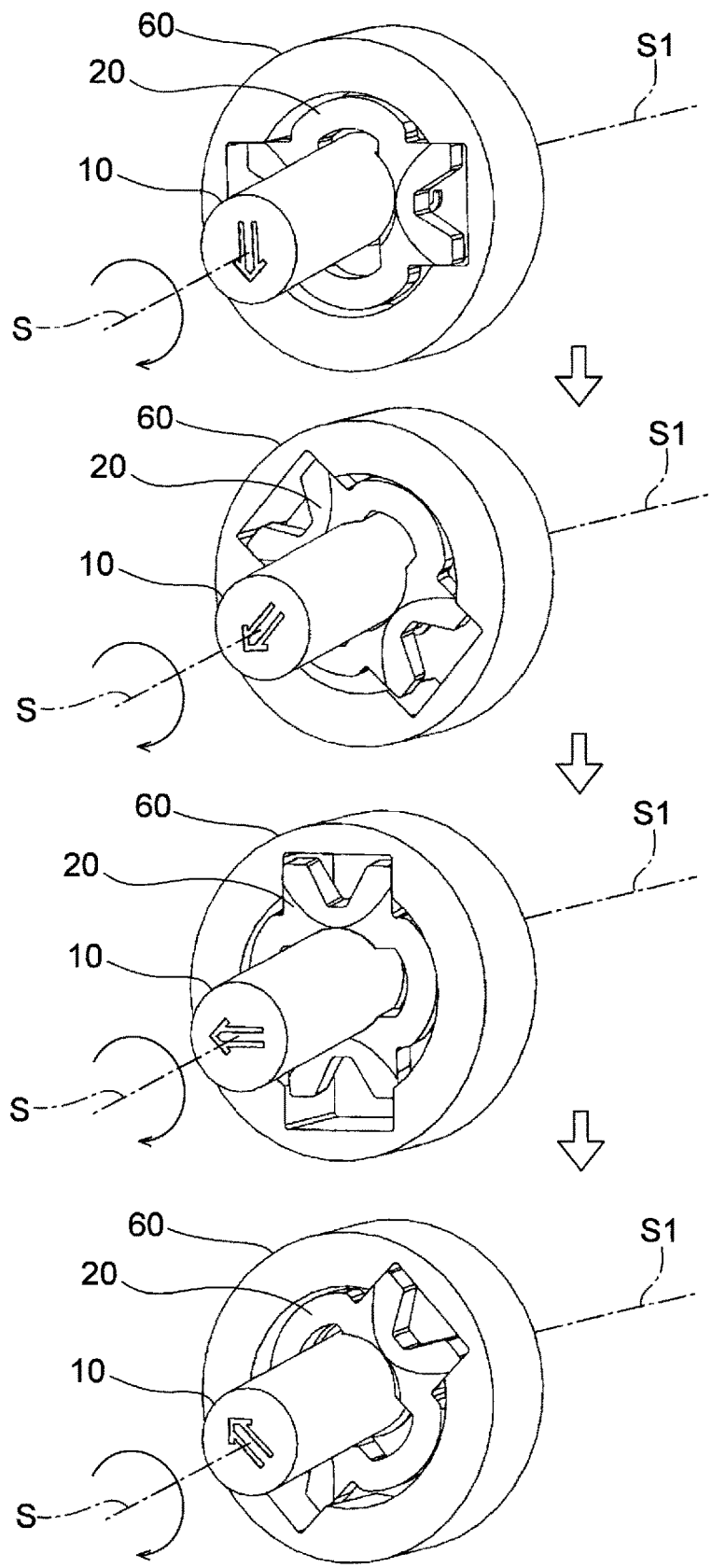
FIG. 14 is an operation diagram illustrating the operations of the core member when the shaft line of the rotation shaft included in the connection unit of the disclosure is in a state of being eccentric and declined with respect to the shaft line of the rotation body.
Figure 15:
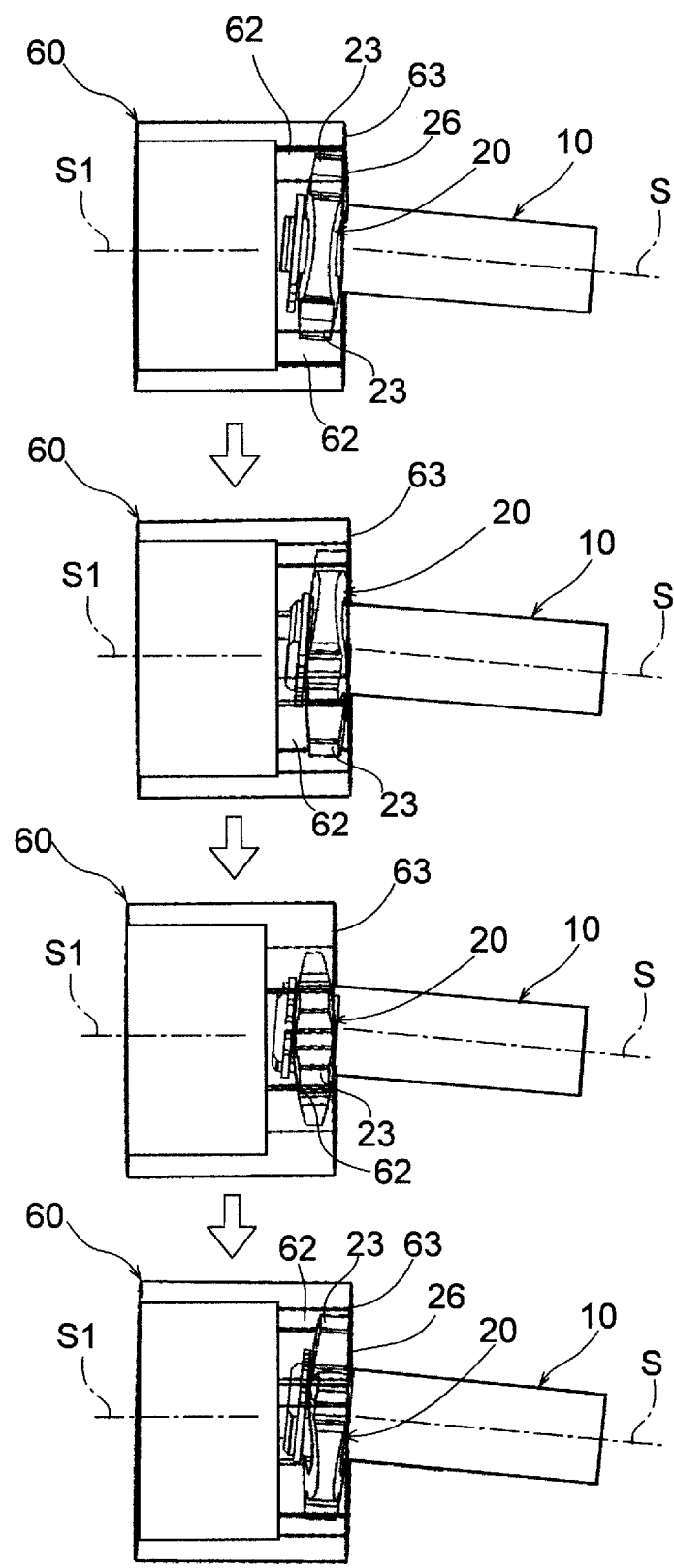
FIG. 15 is an operation diagram illustrating the operations of the core member when the shaft line of the rotation shaft included in the connection unit of the disclosure is in a state of being eccentric and declined with respect to the shaft line of the rotation body.

Next, operations of the connection unit U1 are described with reference to FIGS. 13-15. Besides, FIG. 13 and FIG. 14 are operation diagrams in which the connection unit U1 and the rotation body 60 are viewed diagonally from the front; and FIG. 15 is an operation diagram in which the connection unit U1 and the rotation body 60 are viewed from the side direction. Here, the assembly is performed in a state that the shaft line S of the rotation shaft 10 is connected being eccentric and declined with respect to the rotation center line S1 of the rotation body 60.

As shown in FIG. 13 and FIG. 14, when the rotation shaft 10 rotates in an arrow direction, the core member 20 rotates integrally with the rotation shaft 10 and moves two-dimensionally along the width across flat portion 12. That is, the core member 20 moves in the straight line H direction along the width across flat portion 12 and moves in a manner of swinging around the straight line perpendicular to the width across flat portion 12 to absorb the eccentricity and declination based on position shift of the shaft line S. Accordingly, the fitting portions 23 of the core member 20 maintain a state of always engaging with the fitting grooves 62 of the rotation body 60, and the rotation force of the rotation shaft 10 is transmitted to the rotation body 60. As a result, the rotation body 60 rotates in synchronization with the rotation shaft 10.

In addition, when the rotation shaft 10 rotates in the arrow direction, as shown in FIG. 15, the core member 20 maintains an upstanding posture perpendicular to the width across flat portion 12, and transmits the rotation force to the rotation body 60 while moving two-dimensionally in a state of not protruding from the end surface 63 of the rotation body 60.

In this way, when the core member 20 rotates integrally with the rotation shaft 10, the core member 20 only maintains the upstanding posture with respect to the width across flat portion 12 and moves two-dimensionally along the width across flat portion 12, and thus the conventional swing movement can be prevented. Therefore, generation of vibration or noise accompanying the swing movement can be prevented. In addition, according to the connection unit U1 having the above configuration, the core member 20 is directly held on the rotation shaft 10 via the width across flat portion 12 of the rotation shaft 10, and thus the conventional pin member is unnecessary, and easiness of the assembly work, cost reduction, miniaturization and the like can be achieved.

Furthermore, according to the electric motor M equipped with the connection unit U1 having the above configuration, easiness of the assembly work, cost reduction, miniaturization and the like can be achieved as a whole, and the generation of vibration or noise accompanying the conventional swing movement can be prevented when the electric motor M is used for transmitting the rotation force to the rotation body.

Next, the housing rotor 40, the wave gear mechanism 50, and the rotation body 60 constituting the phase change unit U2 are described. As shown in FIG. 3, the housing rotor 40 includes a first housing 41 rotatably supported around the rotation center line S1 and having sprockets 41a and a second housing 42 coupled to the first housing 41 by a screw b1.

The wave gear mechanism 50 plays a role of generating a relative rotation between the camshaft CS and the housing rotor 40 by rotation of the rotation body 60, and is configured by a first internal gear 51, an external gear 52, and a second internal gear 53.

The first internal gear 51 is formed into a cylindrical shape with bottom using a metal material by forging and the like, and includes a teeth row 51a having a teeth number of N and an outer peripheral surface 51b which slidably supports the inner peripheral surface of the first housing 41. Besides, the first internal gear 51 is fixed by a fastening bolt b2 to rotate integrally with the camshaft CS.

The external gear 52 is formed, using a metal material, into a thin-wall cylindrical shape that can deform elastically and includes a teeth row 52a having a teeth number of N−2 on the outer peripheral surface thereof. In the teeth row 52a, about half of the inner side region in the rotation center line 51 direction engages with the teeth row 51a of the first internal gear 51, and about half of the front side region in the rotation center line 51 direction engages with a teeth row 53a of the second internal gear 53. Herein, the "front side" refers to the left side of the shaft line 51 direction in FIG. 3, and the "inner side" refers to the right side of the shaft line 51 direction in FIG. 3. The second internal gear 53 is formed into a flanged annular shape using a metal material by forging and the like, and includes a teeth row 53a having a teen number of N−2 and a flange portion 53b clamped and fixed between the first housing 41 and the second housing 42.

Then, the external gear 52 is elliptically deformed by receiving a cam action of an action portion 64 of the rotation body 60, and partially engages with the first internal gear 51 in two places and partially engages with the second internal gear 53 in two places.

Figure 4:
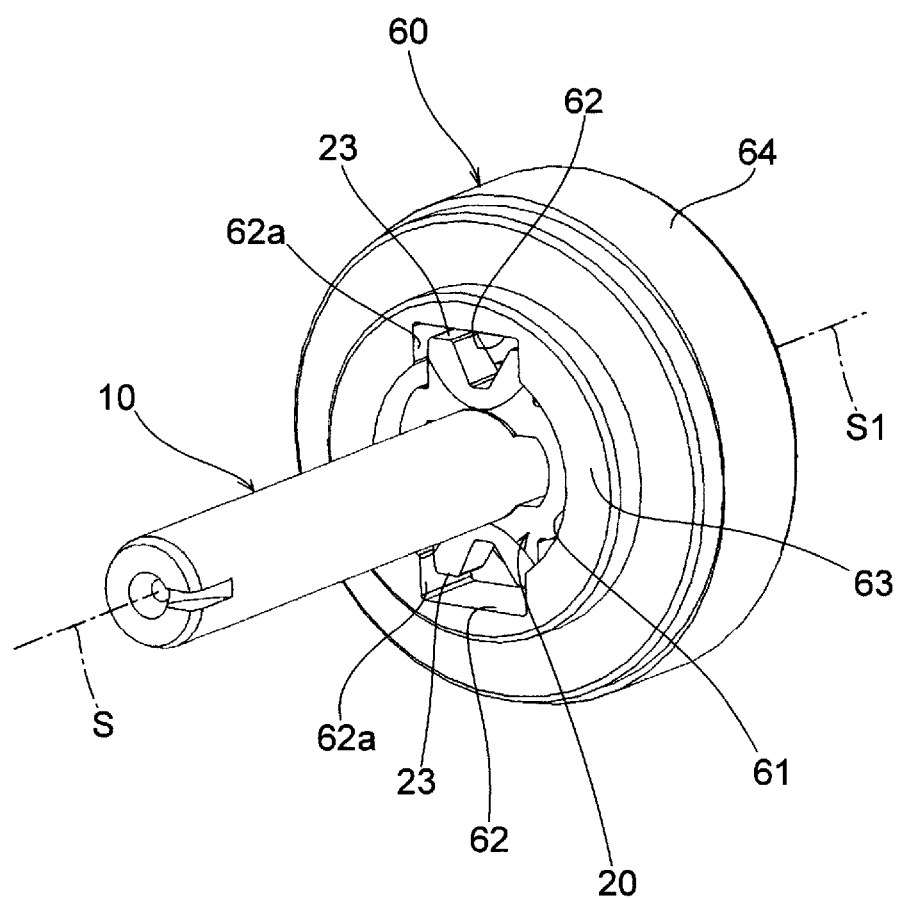
FIG. 4 is an appearance perspective view in which a state that the connection unit of the disclosure and a rotation body of the phase change unit are connected is viewed diagonally from the front.
Figure 5:
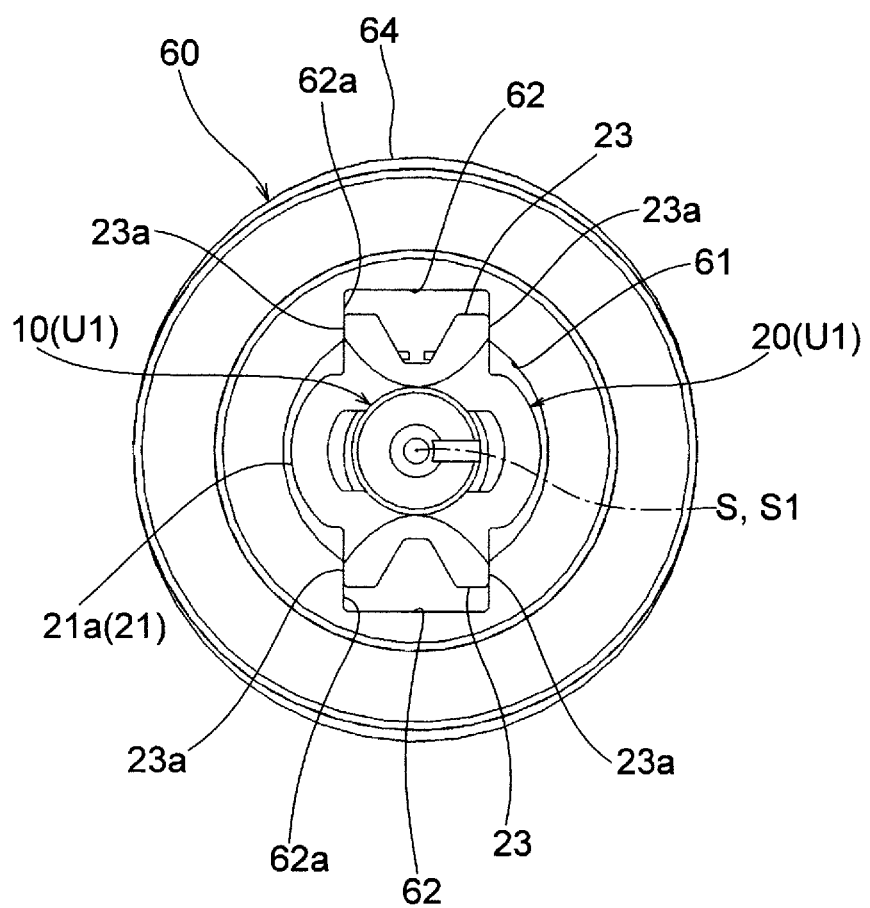
FIG. 5 is a front view in which the state that the connection unit of the disclosure and the rotation body of the phase change unit are connected is viewed from the front.

The rotation body 60 to which the core member 20 of the connection unit U1 is connected and a rotation driving force is applied includes, as shown in FIG. 3-FIG. 5, the through hole 61 in which the annular portion 21 of the core member 20 is inserted, the pair of fitting grooves 62, 62 in which the fitting portions 23 of the core member 20 are fitted, the end surface 63, and the action portion 64 formed into a substantially elliptical shape. The fitting grooves 62 are formed as rectangular grooves, and are formed so that engagement surfaces 23a, 23a on both sides of the fitting portions 23 of the core member 20 are in contact with wall surfaces 62a, 62a on both sides. The action portion 64 exerts a cam action on the external gear 52 via an elastic bearing 65.

Then, the rotation body 60 rotates and thereby the action portion 64 exerts the cam action on the external gear 52, and the external gear 52 in a state of engaging with the first internal gear 51 and the second internal gear 53 deforms elliptically and the engagement position changes continuously around the rotation center line S1.

Next, operations of the valve timing change device including the electric motor M equipped with the connection unit U1 and the phase change unit U2 are described. Firstly, when the phase is not changed, that is, when the valve timing is not changed, the electric motor M is driven and controlled to apply a rotation driving force to the rotation body 60 via the connection unit U1 at a rotation speed the same as the rotation speed of the camshaft CS in the same direction as the direction of the camshaft CS. Accordingly, the first internal gear 51 and the external gear 52 are locked at a position where they engage with each other. In addition, the external gear 52 and the second internal gear 53 are locked at a position where they engage with each other. In this way, the camshaft CS and the housing rotor 40 rotate integrally in one direction around the rotation center line S1.

On the other hand, when the phase is changed, that is, when the valve timing is changed, the electric motor M is driven and controlled to apply a rotation driving force to the rotation body 60 via the connection unit U1 at a rotation speed different from the rotation speed of the camshaft CS in the same direction as the direction of the camshaft CS. For example, when the electric motor M is driven and controlled to apply a rotation driving force to the rotation body 60 via the connection unit U1 at a rotation speed higher than the rotation speed of the camshaft CS in the same direction (the CW direction in FIG. 2) as the direction of the camshaft CS, the rotation body 60 is rotated relatively in one direction around the rotation center line S1, and the action portion 64 of the rotation body 60 exerts the cam action on the external gear 52 while rotating in one direction. Then, when the rotation body 60 rotates once in one direction, the external gear 52 generates a rotation difference by a teeth difference (N−(N−2)) with respect to the first internal gear 51 and deviates in another direction. On the other hand, even when the rotation body 60 rotates in one direction, the external gear 52 and the second internal gear 53 are the same in the teeth number of and thus are kept in the same phase.

That is, the rotation body 60 is rotated continuously in one direction (the CW direction) for a plurality of times, and thereby the rotation phase of the camshaft CS is advanced with respect to the housing rotor 40, and the opening and closing time of intake valve or exhaust valve is changed to an advancing side.

On the other hand, when the electric motor M is driven and controlled to apply a rotation driving force to the rotation body 60 via the connection unit U1 at a rotation speed lower than the rotation speed of the camshaft CS in the same direction as the direction of the camshaft CS, the rotation body 60 is rotated relatively in another direction (the CCW direction in FIG. 2) around the rotation center line 51, and the action portion 64 of the rotation body 60 exerts the cam action on the external gear 52 while rotating in another direction. Then, when the rotation body 60 rotates once in another direction, the external gear 52 generates a rotation difference by the teeth difference (N−(N−2)) with respect to the first internal gear 51 and deviates in one direction (the CW direction in FIG. 2). On the other hand, even when the rotation body 60 rotates in another direction, the external gear 52 and the second internal gear 53 are the same in the teeth number and thus are kept in the same phase.

That is, the rotation body 60 is rotated continuously in another direction (the CCW direction) for plural times, and thereby the rotation phase of the camshaft CS is delayed with respect to the housing rotor 40, and the opening and closing time of intake valve or exhaust valve is changed to a retarding side.

By employing the connection unit U1 having the above configuration, generation of vibration or noise can be prevented in a connection region of the core member 20 and the rotation body 60 during the change operation. In addition, by employing the connection unit U1 having the above con-figuration, for the valve timing change device as a whole, easiness of assembly work, cost reduction, miniaturization and the like can be achieved.

In the above embodiment, as a configuration in which the core member 20 is held on the rotation shaft 10 to be capable of moving relatively in two dimensions along the width across flat portion 12, the configuration is shown in which the core member 20 is directly supported to be slidable with respect to the width across flat portion 12, but the disclosure is not limited hereto, and any configuration in other forms may be employed as long as the core member 20 can relatively move two-dimensionally along the width across flat portion 12.

In the above embodiment, as a configuration in which the core member 20 is held on the rotation shaft 10 to be capable of moving relatively in two dimensions along the width across flat portion 12 without falling over, a case is shown in which the two inner wall surfaces 22*a*, 22*a* formed in the opening portion 22 of the core member 20 are formed as flat surfaces so as to be in surface contact with the flat surfaces 12*a*, 12*a* of the width across flat portion 12, but the disclosure is not limited hereto. For example, a configuration may be employed in which the two inner wall surfaces formed in the opening portion of the core member are formed as semi-cylindrical curved surfaces which are convexly curved toward the flat surfaces 12*a*, 12*a*, and the core member is regulated or guided to be held on the rotation shaft so as not to fall over. As an example, a configuration may also be employed in which the regulation guide portion is formed into a configuration of also regulating falling of the core member and guides the core member to be capable of moving relatively in two dimensions along the width across flat portion 12.

In the above embodiment, the core member 20 equipped with the convex curved surfaces 25 on both sides is shown as a core member, but the disclosure is not limited hereto, and the convex curved surfaces may be abandoned as long as the core member can move two-dimensionally along the width across flat portion 12. In the above embodiment, a case is shown in which the play allowance ΔC of the core member 20 is arranged in the shaft line S direction of the rotation shaft 10, but the disclosure is not limited hereto, and the play allowance may be abandoned when the two-dimensional movement of the core member can be obtained by appropriately changing the shape of the regulation guide portion and the shapes of both sides of the core member.

In the above embodiment, a case is shown in which the step portion 13 of the rotation shaft 10 and the C-ring 30 fixed to the rotation shaft 10 are employed as the regulation guide portion which regulates the movement of the core member 20 in the shaft line S direction of the rotation shaft 10 and guides the two-dimensional movement of the core member 20, but the disclosure is not limited hereto, and a female screw portion may be arranged on the leading end side of the width across flat portion in the rotation shaft and a double nut screwed into the female screw portion may be employed in place of the C-ring 30.

In the above embodiment, the planar step portion 13 and the C-ring 30 are shown as the regulation guide portion which regulates the movement of the core member 20 in the shaft line S direction of the rotation shaft 10 and guides the two-dimensional movement of the core member 20, but the disclosure is not limited hereto, and a stopper and a step portion which forms a curved surface convexly curved toward the core member 20 may also be employed.

In the above embodiment, the rotation body 60 acting on the wave gear mechanism 50 is shown as the rotation body to which the core member 20 of the connection unit U1 is connected, but the disclosure is not limited hereto, and the rotation body included in a planetary gear mechanism may also be used.

As described above, the connection unit of the disclosure can prevent generation of vibration or noise accompanying the conventional swing movement and achieve easiness of assembly work, cost reduction, miniaturization and the like, and thus cannot be only used as a connection unit which connects the electric motor for driving the phase change unit of the valve timing change device, but can also be used in other mechanisms for transmitting a rotation driving force.

Other Configurations

A connection unit of the disclosure is a connection unit connected to a rotation body in the manner of fitting to transmit a rotation force and includes a rotation shaft, having a width across flat portion; and a core member, having fitting portions fitted to the rotation body in a direction perpendicular to the width across flat portion and an annular portion in which the width across flat portion is slidably fitted, and held on the rotation shaft to be capable of moving relatively in two dimensions along the width across flat portion while rotating integrally with the rotation shaft.

According to an embodiment of the disclosure, the connection unit may employ a configuration which includes a regulation guide portion arranged on the rotation shaft to regulate a movement of the core member in a shaft line direction of the rotation shaft and to guide a two-dimensional movement of the core member.

According to an embodiment of the disclosure, the connection unit may employ a configuration in which the core member comprises convex curved surfaces which are regulated and guided by being contact with the regulation guide portion on both sides in the shaft line direction.

According to an embodiment of the disclosure, the connection unit may employ a configuration in which the convex curved surfaces are formed to become a part of cylindrical surfaces with a straight line perpendicular to the width across flat portion as a generating line.

According to an embodiment of the disclosure, the connection unit may employ a configuration in which the regulation guide portion is formed to place a prescribed play allowance in the shaft line direction and regulate the movement of the core member.

According to an embodiment of the disclosure, the connection unit may employ a configuration in which the regulation guide portion includes: a step portion which defines a boundary of the width across flat portion in the rotation shaft, and a stopper which is fixed to the rotation shaft so as to cooperate with the step portion to clamp the core member.

According to an embodiment of the disclosure, the connection unit may employ a configuration in which the stopper is a C-ring fitted into fitting grooves of the rotation shaft.

According to an embodiment of the disclosure, the connection unit may employ a configuration in which the annular portion of the core member is formed to define an opening portion that is substantially rectangular and the width across flat portion is fitted in a manner of being two-dimensionally slidable, and the opening portion includes a flat inner wall surface being flat in a region in contact with the width across flat portion.

According to an embodiment of the disclosure, the connection unit may employ a configuration in which the core member is formed with a thickness dimension in the shaft line direction of the rotation shaft that is smaller than a width dimension of the width across flat portion.

According to an embodiment of the disclosure, the connection unit may employ a configuration, in which the core member includes tapered surfaces in regions of the fitting portions, and the thickness dimension of the tapered surfaces in the shaft line direction of the rotation shaft is gradually reduced toward front ends of the core member.

According to an embodiment of the disclosure, the connection unit may employ a configuration in which the core member includes substantially U-shaped or V-shaped cutouts, which open toward front ends of the core member, in the regions of the fitting portions.

An electric motor according to another aspect of the disclosure is an electric motor including a connection unit which is connected to an external rotation body to transmit a rotation driving force, and a connection unit having any of the above configurations is used as the connection unit.

A valve timing change device according to another aspect of the disclosure is an engine valve timing change device including a phase change unit that changes a relative rotation phase between a camshaft and a housing rotor interlocked with a crankshaft; and an electric motor including a connection unit that is connected to a rotation body of the phase change unit to transmit a rotation driving force. The valve timing change device changes opening and closing time of a valve for intake or exhaust driven by the camshaft to an advancing side or a retarding side, and a connection unit having any of the above configurations is used as the connection unit.

According to the connection unit having the above configuration, generation of vibration or noise along with a conventional swing movement can be prevented, and easiness of assembly work, cost reduction, miniaturization and the like can be achieved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A connection unit for transmitting a rotation force to a rotation body the connection unit comprising:
    a rotation shaft including a width across flat portion arranged at a first end of the rotation shaft; and
    a core including:
        a rectangular portion defining a rectangular opening portion configured to slidably receive the width across flat portion,
        two protrusions which protrude in a direction perpendicular to the width across flat portion, the two protrusions configured to engage the rotation body, and
        a cut-out formed, on a radial outer edge of each protrusion; and
    a regulation guide portion arranged on the rotation shaft at the width across flat portion, the regulation guide portion configured to limit a movement of the core in an axial direction of the rotation shaft and to guide a two-dimensional movement of the core with respect to the width across flat portion as the core rotates integrally with the rotation shaft,
    wherein the rectangular portion includes longitudinal ends with circular arc surfaces, and two straight sides that connect the circular arc surfaces, wherein each of the two protrusions defines a tapered surface with a thickness dimension in the axial direction that gradually decreases towards the radial outer edge, wherein axially-facing end surfaces of the core are opposed convex surfaces each defined by a radius of curvature having a respective center disposed along an axis of the rotation shaft, and wherein the regulation guide portion comprises a step portion defining a boundary of the width across flat portion, and a stopper fixed to the rotation shaft so as to cooperate with the step portion in clamping the core.

2. The connection unit according to claim 1,
wherein the opposed convex surfaces are each regulated and guided by being contact with the regulation guide portion.

3. The connection unit according to claim 2,
wherein the opposed convex surfaces each define a partial cylindrical surface extending perpendicular to the width across flat portion.

4. The connection unit according to claim 1,
wherein a prescribed play allowance is provided between the step portion and the stopper so as to enable the two-dimensional movement of the core.

5. The connection unit according to claim 1, wherein the stopper is a C-ring fitted in fitting grooves of the rotation shaft.

6. The connection unit according to claim 1,
wherein the opening portion comprises a flat inner wall surface in a region in contact with the width across flat portion.

7. The connection unit according to claim 1,
wherein the thickness dimension of the two protrusions is smaller than a width dimension of the width across flat portion.

8. The connection unit according to claim 1,
wherein the cut-outs are substantially U-shaped or V-shaped cut-outs, so as to open toward outer sides of the core in a direction perpendicular to the axial direction.

9. An electric motor, comprising:
the connection unit according to claim 1.
10. An electric motor, comprising:
the connection unit according to claim 2.
11. An electric motor, comprising:
the connection unit according to claim 3.
12. An electric motor, comprising:
the connection unit according to claim 4.
13. A valve timing change device for an engine, the valve timing change device comprising:
an electric motor a including the connection unit according to claim 1; and
a phase change unit including a housing rotator, a gear mechanism, and a rotation body, the phase change unit configured to change a relative rotation phase between a camshaft and a housing rotor interlocked with a crankshaft so as to advance or retard an opening and closing time of a gas exchange valve driven by the camshaft,
wherein the connection unit is connected to the rotation body of the phase change unit so as to transmit the rotation force.

14. The valve timing change device according to claim 13,
wherein the opposed convex surfaces are each regulated and guided by being contact with the regulation guide portion.

15. The valve timing change device according to claim 14,
wherein the opposed convex surfaces each define a partial cylindrical surface extending perpendicular to the width across flat portion.

* * * * *